US009361326B2

(12) United States Patent
Driesen et al.

(10) Patent No.: US 9,361,326 B2
(45) Date of Patent: Jun. 7, 2016

(54) SELECTABLE DATA MIGRATION

(75) Inventors: Volker Driesen, Walldorf (DE); Juergen Specht, Benningen (DE)

(73) Assignee: SAP SE, Walldorf (DE)

( * ) Notice: Subject to any disclaimer, the term of this patent is extended or adjusted under 35 U.S.C. 154(b) by 1440 days.

(21) Appl. No.: 12/336,897

(22) Filed: Dec. 17, 2008

(65) Prior Publication Data
US 2010/0153341 A1 Jun. 17, 2010

(51) Int. Cl.
*G06F 17/30* (2006.01)
(52) U.S. Cl.
CPC .................................. *G06F 17/303* (2013.01)
(58) Field of Classification Search
CPC .................................................. G06F 17/303
USPC ....................................................... 707/610
See application file for complete search history.

(56) References Cited

U.S. PATENT DOCUMENTS

| | | | |
|---|---|---|---|
| 6,269,382 B1* | 7/2001 | Cabrera et al. | |
| 6,373,383 B1* | 4/2002 | Arrowsmith et al. | 340/506 |
| 6,895,382 B1* | 5/2005 | Srinivasan | G06Q 10/063118 705/317 |
| 6,938,039 B1* | 8/2005 | Bober et al. | 707/704 |
| 7,072,913 B2* | 7/2006 | Jans | G06F 9/52 |
| 7,146,475 B2* | 12/2006 | Perego | 711/162 |
| 7,197,490 B1* | 3/2007 | English | G06F 17/30067 |
| 7,584,475 B1* | 9/2009 | Lightstone et al. | 718/104 |
| 7,721,138 B1* | 5/2010 | Lyadvinsky et al. | 714/4.1 |
| 7,882,092 B2* | 2/2011 | Dasgupta et al. | 707/705 |
| 8,069,218 B1* | 11/2011 | Tormasov et al. | 709/216 |
| 2003/0130985 A1* | 7/2003 | Driesen et al. | 707/1 |
| 2005/0149582 A1* | 7/2005 | Wissmann et al. | 707/201 |
| 2005/0195660 A1* | 9/2005 | Kavuri | G06F 3/0605 365/189.05 |
| 2006/0101084 A1* | 5/2006 | Kishi et al. | 707/200 |
| 2007/0022121 A1* | 1/2007 | Bahar et al. | 707/10 |
| 2007/0156729 A1* | 7/2007 | Shaylor | 707/100 |
| 2007/0239797 A1* | 10/2007 | Cattell et al. | 707/201 |
| 2008/0016021 A1* | 1/2008 | Gulbeden et al. | 707/1 |
| 2008/0098046 A1* | 4/2008 | Alpern et al. | 707/203 |
| 2008/0162494 A1* | 7/2008 | Long et al. | 707/10 |
| 2008/0208830 A1* | 8/2008 | Lauckhart et al. | 707/4 |
| 2009/0089334 A1* | 4/2009 | Mohamed et al. | 707/200 |

OTHER PUBLICATIONS

Hansen, J., and Henriksen, A. Nomadic operating systems. In Master's thesis, Dept. of Computer Science, University of Copenhagen, Denmark, 2002.*
Noack, M. Comparative evaluation of process migration algorithms. Master's thesis, Dresden University of Technology—Operating Systems Group, 2003.*

(Continued)

*Primary Examiner* — Huawen Peng
(74) *Attorney, Agent, or Firm* — Schwegman Lundberg & Woessner, P.A.

(57) ABSTRACT

In some example embodiments, a computerized method includes determining at least one of a read frequency, a write frequency and a data volume for data persistently stored. The data has a first format. The method also includes selecting a first type of data migration or a second type of data migration, wherein the selecting is derived from at least one of the read frequency, the write frequency and the data volume for the data persistently stored. The method includes transforming the data to a second format using the selected data migration. The method includes outputting the data for storage in machine-readable medium.

9 Claims, 5 Drawing Sheets

(56) References Cited

OTHER PUBLICATIONS

C. Clark, K. Fraser, S. Hand, J. G. Hansen, E. Jul, C. Limpach, I. Pratt, and A. Warfield. Live Migration of Virtual Machines. NSDI, 2005.*

Y. Luo, B. Zhang, X. Wang, Z. Wang, and Y. Sun, "Live and incremental whole-system migration of virtual machines using block-bitmap," in Proceedings of Cluster 2008: IEEE International Conference on Cluster Computing. IEEE Computer Society, 2008.*

"European Application Serial No. 09010176, Extended European Search Report mailed Nov. 5, 2009", 6 pgs.

Connelly, Timothy J, et al., "Solving the NGN Data Migration Challenge", *Annual Review of Communications vol. 61*, (Jan. 1, 2008), 115-121.

Gandhi, Rajiv, et al., "Combinatorial Algorithms for Data Migration to Minimize Average Completion Time", *Algorithmica 54*, (2009), 54-71.

Hohenstein, Uwe, "Supporting Data Migration Between Relation and Object-Oriented Databases Using a Federation Approach", *Database Engineering and Applications Symposium*, (Sep. 18, 2000), 10 pgs.

* cited by examiner

SELECTABLE DATA MIGRATION

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2008, SAP AG. All Rights Reserved.

BACKGROUND

In general, there can be different versions of a software application. For example, a later version of the application may include new features, bug fixes, etc. relative to the current version. In some situations, data migration may be required if the new version requires the persistent data to be in a new or modified format. For example, the new version may require new database table fields, changed table field types, new tables, etc. Data migration may also be required when the new version requires a merging of existing database table entries with new table entries.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Figure 1:
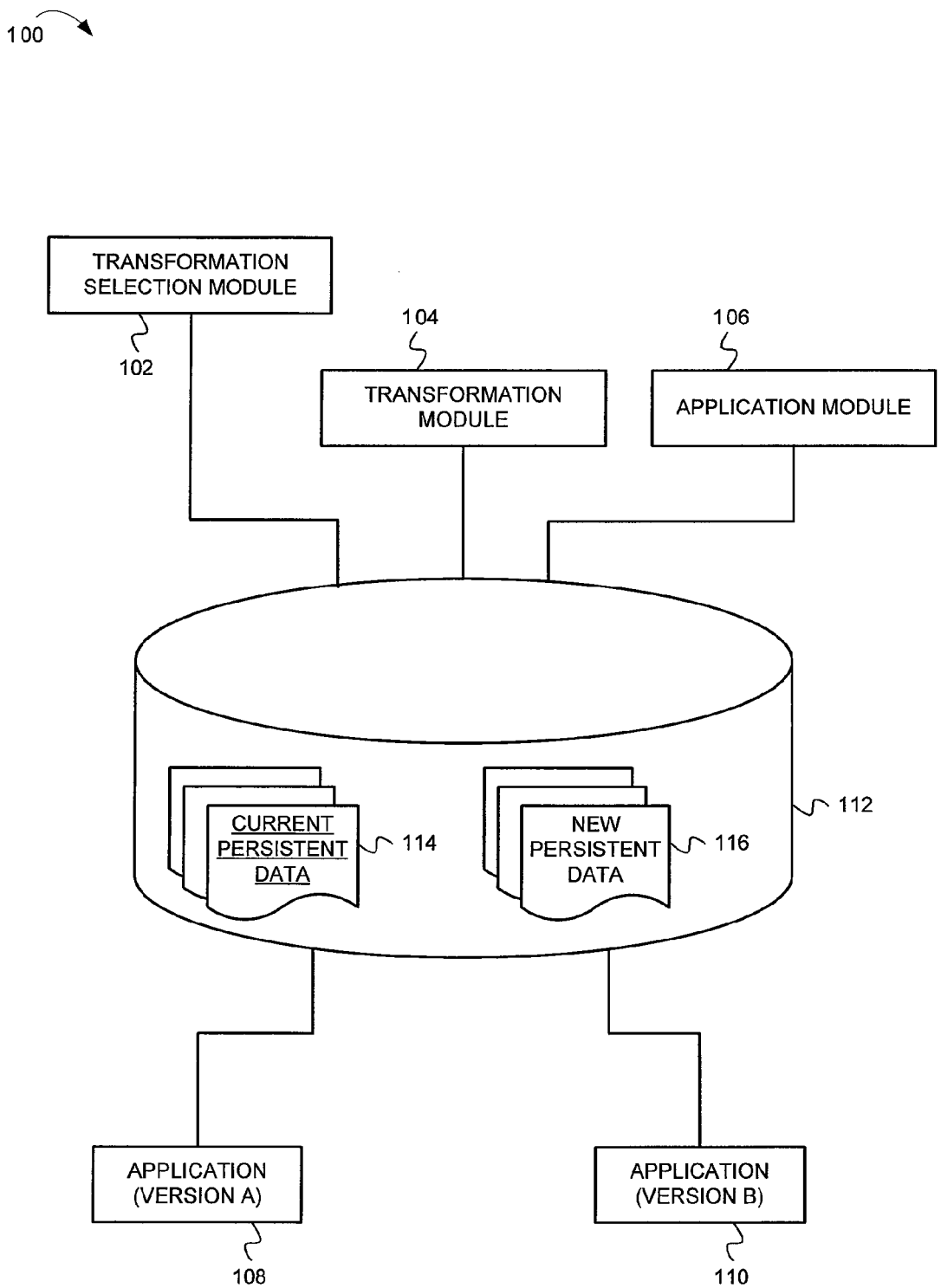
FIG. 1 illustrates a system for data migration, according to some example embodiments.

Methods, apparatus and systems for data migration are described. In the following description, numerous specific details are set forth. However, it is understood that embodiments of the invention may be practiced without these specific details. In other instances, well-known circuits, structures and techniques have not been shown in detail in order not to obscure the understanding of this description.

Some example embodiments are used to migrate data as part of an upgrade of an application from a current version to a new version. In particular, in operation, the application may access (read or write) persistent data. This new version of the application may require changes to the persistent data. For example, the persistent data may require new data structures, updates to existing data structures (e.g., new entries), removal of data structures or parts thereof, etc. Therefore, the data is migrated from a first format to a second format.

Data migration can last for minutes, hours or even days, depending on the amount of data and changes thereto. For performance reasons, data migration may violate database consistency rules. For example, the data migration may perform mass operations on individual database tables in parallel. Some example embodiments are used to minimize the amount of downtime required to change to a different version of an application used to access the persistent data.

Down time caused by data migration may force users of the application (e.g., customers) to suffer from long runtimes needed to migrate data that may actually neither be read nor written (at least initially) following uptime of the application. In particular, customer databases are often in the gigabyte or terabyte range, whereas the part of the data being actively accessed by the application is relatively small.

Some example embodiments enable data migration while the software is still operating productively (e.g., online data migration). In some example embodiments, the type of data migration is dependent on system usage of the data. In some example embodiments, the types of data migration are different combinations of incremental conversion, lazy migration, downtime migration, etc. In some example embodiments, for incremental conversion, the persistent data is copied and stored separate from the persistent data currently being accessed by the current version. For incremental conversion, the copied data is then migrated incrementally (e.g., one at a time). For example, if a large number of database tables need to be updated to include a new entry, the incremental conversion may update the tables one at a time. A more detailed description of incremental conversion is set forth below. In some example embodiments, the incremental conversion occurs prior to downtime of the application.

For lazy migration, the new target data is created as the new version of software is deployed. However, in some example embodiments, the data migration has not yet occurred. Accordingly, the new version of software is switched directly to the new target data. However, this new version can also still access the old persistent data. Thus, for read access of the data, the new version may first attempt to access the data from the new persistency. If the data is not in the new persistency, the data is read from the old persistency. If the data is in the new persistency, the data is read there from. Further, for lazy migration, a batch execution may occur for migrating the data from the old to the new persistency in parallel to the data being accessed. A more detailed description of lazy migration is set forth below. In some example embodiments, the lazy migration occurs after the downtime of the application.

In some example embodiments, the type of data migration used is dependent on the use of the data. For example, the type of data migration may be dependent on the use categorization of the data (e.g., read frequency, write frequency, data volume, etc.). In some example embodiments, the different types of use categorization include the following:

A) low rate of both read and write of the data
B) low read rate, high write rate of the data
C) high read rate, low write rate
D) high rate of both read and write with low data volume; and
E) high rate of both read and write, with high data volume In some example embodiments, the incremental conversion is used to migrate (transform) data that has a high read frequency but a low write frequency. Further, in some example embodiments, the lazy migration is used to migrate (transform) data that has a high write frequency but a low read frequency. In some example embodiments, the write frequency, the read frequency and the data volume may be determined from the design of the application, the database, etc. and/or actual usage by the application.

Some example embodiments may perform different types of migration to different sets of the persistent data. For example, the selected type of migration may be performed for individual parts of data structure (e.g., database table row level), data structures (e.g., database tables), groups of data structures, etc. Accordingly, this level of granularity for the type of migration may significantly reduce down times of the application. While described relative to upgrades to an application, embodiments are not so limited. Data migration may occur for any reason wherein the persistent data needs to be changed from a first format to a second format.

FIG. 1 illustrates a system for data migration, according to some example embodiments. A system 100 comprises a transformation selection module 102, a transformation module 104, an application module 106, an application (version A) 108, an application (version B) 110 and a machine-readable medium 112. In some embodiments, the system 100 is representative of a computer. Alternatively or in addition, some or all of the components of the system 100 are distributed over a number of computers that are coupled together through a network.

In some example embodiments, the machine-readable medium 112 includes tangible volatile and/or non-volatile media (e.g., read only memory (ROM), random access memory (RAM), magnetic disk storage media, optical storage media, flash memory devices, etc.). The machine-readable medium 112 stores current persistent data 114 and new persistent data 116.

In some example embodiments, the application (version A) 108 and the application (version B) 110 are any type of applications that access (read or write) data from a machine-readable medium. In this example, the application 110 is a later version (e.g., upgrade) of the application 108. Also, a format of the current persistent data 114 is compatible with the application 108. A format of the new persistent data 116 is compatible with the application 110. Thus, the format of the current persistent data 114 and the format of the new persistent data 116 are configured for being accessed by the application 108 and the application 110, respectively.

In some example embodiments, the application module 106 executes either the application 108 or the application 110, which is to access the data from the machine-readable medium 112 during execution. As further described below, the transformation selection module 102 determines at least one a read frequency, a write frequency and a data volume of the persistent data. Using at least one of the read frequency, the write frequency and the data volume, the transformation selection module 102 then selects a particular type of data migration to migrate the data from a first format into a second format. In particular, the transformation selection module 102 determines the type of data migration to migrate the current persistent data 114 to the new persistent data 116.

As further described below, the transformation module 104 performs a transformation of the current persistent data 114 to the new persistent data 116, using the type of data migration selected by the transformation selection module 102. In some example embodiments, this transformation is part of an upgrade of the application from the application (version A) 108 to the application (version B) 110.

In some example embodiments, the transformation selection module 102, the transformation module 104, the application module 106, the application (version A) 108 and the application (version B) 110 are software, hardware, firmware or a combination thereof for executing the various operations described herein, according to some example embodiments.

Figure 2:
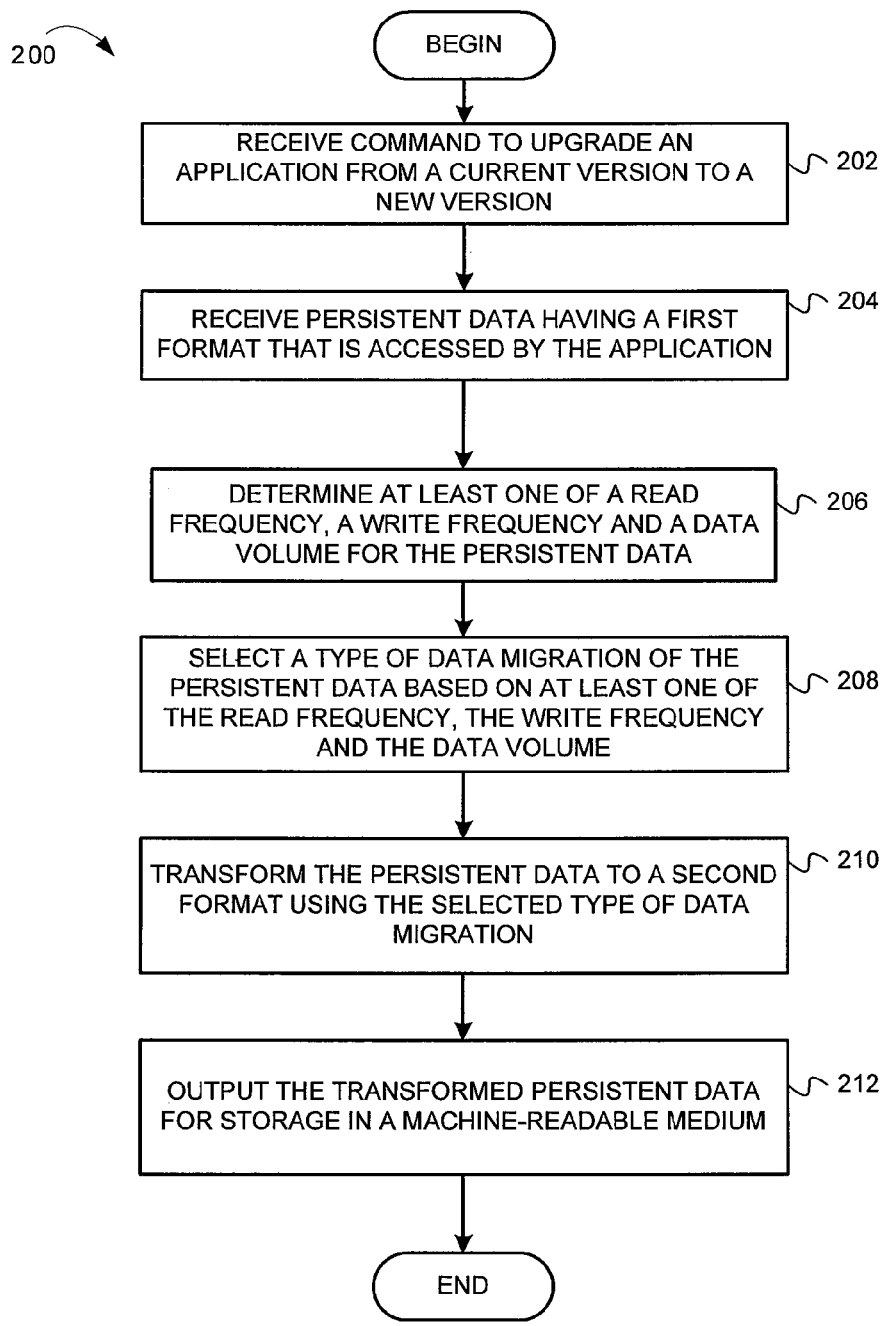
FIG. 2 is a diagram of a method for data migration as part of an application upgrade, according to some example embodiments.

Operations, according to some example embodiments, are now described. In certain embodiments, the operations are performed when instructions residing on machine-readable media (e.g., software) are executed, while in other embodiments, the methods are performed by hardware or other logic (e.g., digital logic). FIG. 2 is a diagram of a method for data migration as part of an application upgrade, according to some example embodiments. In some example embodiments, the method 200 is performed by the transformation selection module 102 and the transformation module 104. The method 200 commences at block 202.

At block 202, the transformation module 104 receives a command to upgrade an application from a current version to a new version. The transformation module 104 can receive this command from a number of different sources and in response to a number of different operations. For example, in some example embodiments, this command comes from the user after both versions are operational. Alternatively or in addition, this command is received as a result of the installation of the new version of the application. The method 200 continues at block 204.

At block 204, the transformation selection module 102 receives persistent data having a first format that is accessed by the application to be upgraded. With reference to FIG. 1, the transformation selection module 102 receives the current persistent data 114 from the machine-readable medium 112. The method 200 continues at block 206.

At block 206, the transformation selection module 102 determines at least one of a read frequency, a write frequency and a data volume for the persistent data. The transformation selection module 102 can determine the read frequency, the write frequency and the data volume using a number of techniques. In some example embodiments, these frequencies and data volume are stored along with the current persistent data 114. Further, in some example embodiments, these frequencies and data volume are updated each time the current persistent data 114 is accessed. For example, after an application reads or writes from the current persistent data 114, the read frequency and the write frequency, respectively, are updated. The data volume can similarly be updated as data is added and removed from the current persistent data 114. Alternatively or in addition, the transformation selection module 102 can calculate the data volume at the time of this determination operation. For example, the transformation selection module can determine the amount of storage occupied by the current persistent data 114, the number of data structures or entries in data structures within the current persistent data, etc. The method 200 continues at block 208.

At block 208, the transformation selection module 102 selects a type of data migration of the persistent data based on at least one of a read frequency, a write frequency and a data volume for the persistent data. The description of FIG. 3 (which is set forth below) provides a more detailed discussion of selecting the type of data migration, according to some example embodiments. The method 200 continues at block 210.

At block 210, the transformation module 104 transforms the persistent data to a second format using the selected type of data migration. In some example embodiments, the types of data migration include incremental conversion, lazy migration or down time migration. The transformation module 104 can transform parts of the data using one type of data migration or a combination of different types of data migration. Further, the transformation module 104 can perform the data migration at different times relative to downtime of the application as the version is being upgraded from a current version to new version. A more detailed description of the types of data migration and the timing of the data migration is set forth below in conjunction with the description of FIG. 3. The method 200 continues at block 212.

At block 212, the transformation module 104 outputs the transformed persistent data for storage in a machine-readable medium. With reference to FIG. 1, the transformation module 104 outputs the transformed current persistent data 114 as the new persistent data 116 (stored in the machine-readable medium 112). Accordingly, after the upgrade of the application to version B (110), the application 110 can then access the new persistent data 116 that has the new format. The method 200 is complete.

Figure 3:
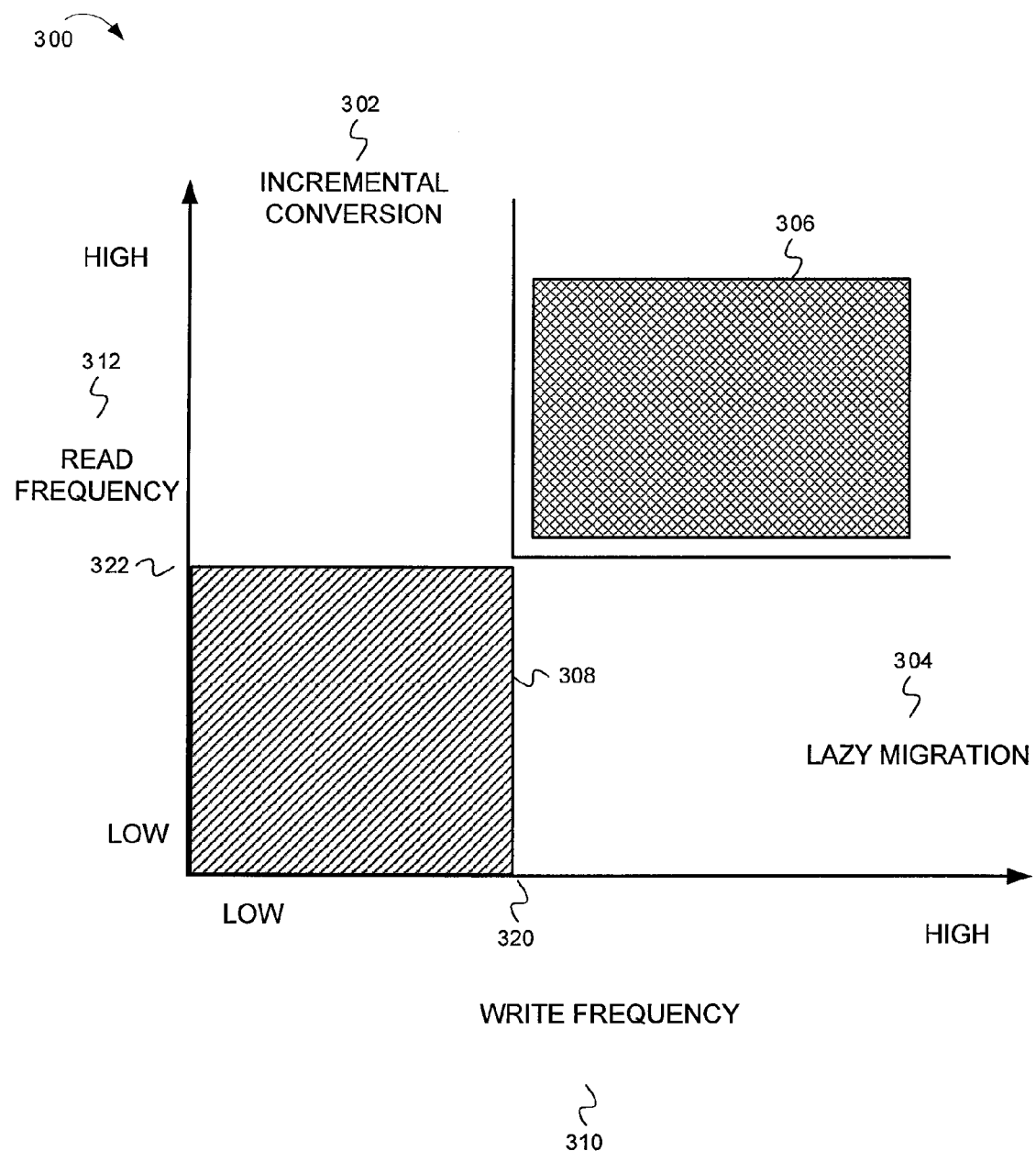
FIG. 3 illustrates a graph showing the relationship among the types of data migration, the read frequency and the write frequency, according to some example embodiments.

A method for selection of the type of data migration is now described. To assist in the description of the selection, FIG. 3 illustrates a graph showing the relationship among the types of data migration, the read frequency and the write frequency, according to some example embodiments. In particular, FIG. 3 illustrates a graph 300 that includes an x-axis 310 that is a write frequency of the data to be migrated. The graph 300 also includes a y-axis 312 that is a read frequency of the data to be migrated. In some example embodiments, data having a high read frequency, it is important to enable a fast read in the new format for the data. In some example embodiments, data having a high write frequency, it is important to enable a fast write in the new format for the data.

For data having a write frequency below a write threshold (e.g., frequency point 320), the type of data migration to be used is incremental conversion (see incremental conversion section 302 in the graph 300). In other words, incremental conversion is a better choice of data migration if the number of write accesses to the data is low. For data having a read frequency below a read threshold (e.g., frequency point 322), the type of data migration to be used is lazy migration (see lazy migration section 304 in the graph 300). In other words, lazy migration is a better choice of data migration if the number of read accesses of the data is low. For data having a low write frequency and a low read frequency, either incremental conversion or lazy migration can be selected (see section 308 of the graph 300). For data having a high write frequency and a high read frequency, the selection can be more problematic (see section 306). In some example embodiments, for such data, the amount of data volume is used to determine the type of data migration. In some example embodiments, for such data, if the amount of data volume is above a volume threshold, any of the data migrations (e.g., incremental conversion, lazy migration, down time migration, etc.) are used. In some example embodiments, either or both the incremental conversion and the lazy migration are selected for such data. In some example embodiments, for data having a high write frequency and a high read frequency and a data volume below a volume threshold, the down time migration is selected. Accordingly in some example embodiments, the type of data migration is dependent on system usage of the data (including number and type of data accesses and the amount of data volume).

In some example embodiments, incremental migration and lazy migration occur during up time of the application. In some example embodiments, incremental migration occurs prior to down time of the application for upgrading to a different version. In some example embodiments, lazy migration occurs after down time of the application for upgrading to a different version.

For incremental migration, the migration can be done in the background and incrementally performs the update (one by one updates of the data). In some example embodiments, as soon as a given threshold of data has been migrated to the new data, the application can then be switched to access the new persistent data. For incremental migration, the persistent data to be migrated can be enabled for "log changes." The new persistency can then be created. Then, the data is incrementally migrated repeatedly performing the following operations until the migration is complete. First, the logged entries from the current persistent data are read. Second, the data is migrated to the new format. Third, the data with the new format is written to the new persistent data.

For lazy migration, the new persistency is created at the time of the upgrade. However, at this time, the data migration is not yet done. After the new version of the application is executing, the new version of the application is switched to directly access data from the new persistent data. If a given set of data has not yet been migrated and stored in the new persistent data, the new version of the application can then access the data from the current persistent data. Accordingly, for a lazy migration, the new persistent data is created (without the new data stored therein). In some example embodiments, the "mass read" operations (e.g., operations for reporting, analytics, etc.) of the data are locked from operation. In such embodiments, the lazy migration can execute more easily and can run without significant impact on performance, while still enabling the most critical application features. Further, in such embodiments, the lock of these "mass read" operations can be released after the migration is complete.

Further with regard to lazy migration, for a data access, the new version of the application attempts to access the data in the new persistent data. If the data is available in the new persistent data, the data is accessed there from. If the data is not available in new persistent data, the data is accessed from the current persistent data. Also as part of the data access, the data can be written to the new persistent data in the new format. This data access can be a read or write access. Moreover, as part of the lazy migration, the data can be migrated to the new persistent data while the data is being accessed (from the current persistent data and the new persistent data).

A third type of data migration is a down time migration. A down time migration migrates the data into the new persistent data that is based on the second format while the application is not operational (i.e., down). Such a migration is avoided because of the potential impact on operations that use the application.

Figure 4:
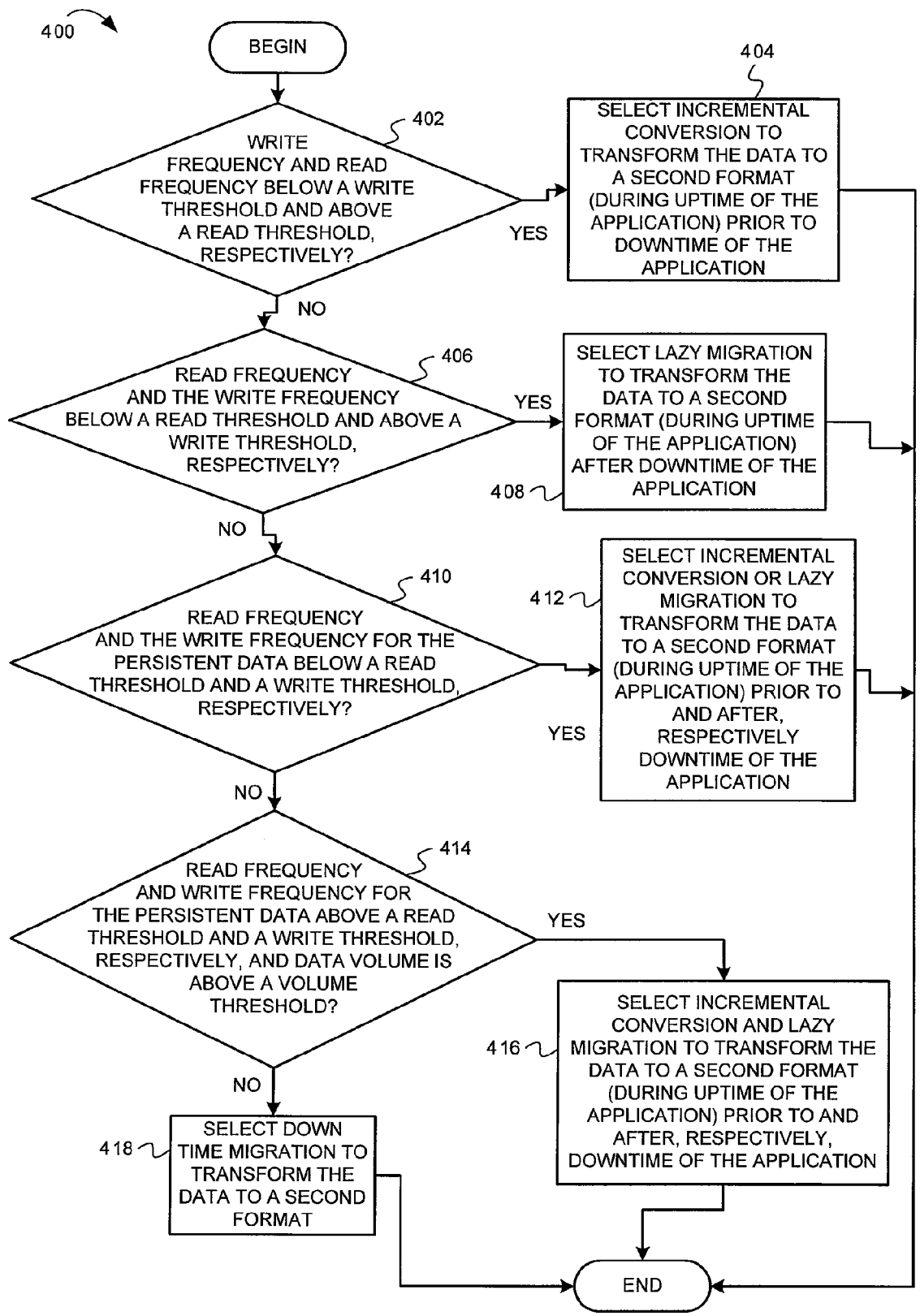
FIG. 4 is a diagram of a method for selection of the type of data migration, according to some example embodiments.

FIG. 4 is a diagram of a method for selection of the type of data migration, according to some example embodiments. In some example embodiments, the method 400 is performed by the transformation selection module 102 and is described with reference to the graph 300 of FIG. 3. The method 400 commences at block 402.

At block 402, the transformation selection module 102 determines whether the write frequency and the read frequency for the current persistent data 114 are below a write threshold and above a read threshold, respectively. The write threshold and the read threshold values can vary depending on a number of factors. Factors can include the type of application, the type of data, the amount of data, etc. Further, these values can be configurable, thereby enabling a user to set these values. With reference to FIG. 3, the transformation selection module 102 is determining whether the data falls into the incremental conversion section 302 (above the read threshold 322) of the graph 300. If the write frequency and the read frequency are below the write threshold and above the read threshold, respectively, the method 400 continues at block 404. Otherwise, the method 400 continues at block 406 (described below).

At block 404, the transformation selection module 102 selects the incremental conversion to transform the data to a second format. In some example embodiments, this incremental conversion is performed (during uptime of the application) prior to downtime of the application. The method 400 is complete after this selection.

At block 406, the transformation selection module 102 determines whether the read frequency and the write frequency for the current persistent data 114 are below a read threshold and above a write threshold, respectively. With reference to FIG. 3, the transformation selection module 102 is determining whether the data falls into the lazy migration section 304 (above the write threshold 320) of the graph 300. If the read frequency and the write frequency are below the read threshold and above the write threshold, respectively, the method 400 continues at block 408. Otherwise, the method 400 continues at block 410 (described below).

At block 408, the transformation selection module 102 selects the lazy migration to transform the data to a second format. In some example embodiments, this lazy migration is performed (during uptime of the application) after downtime of the application. The method 400 is complete after this selection.

At block 410, the transformation selection module 102 determines whether the read frequency and the write frequency for the current persistent data 114 are below a read threshold and below a write threshold, respectively. With reference to FIG. 3, the transformation selection module 102 is determining whether the data falls into the section 308 (below the write threshold 320 and the read threshold 322) of the graph 300. If the read frequency and the write frequency are below the read threshold and below the write threshold, respectively, the method 400 continues at block 412. Otherwise, the method 400 continues at block 414 (described below).

At block 412, the transformation selection module 102 selects the incremental conversion or the lazy migration to transform the data to a second format. In some example embodiments, if incremental conversion is selected, the incremental conversion is performed (during uptime of the application) prior to downtime of the application. In some example embodiments, if lazy migration is selected, the lazy migration is performed (during uptime of the application) after downtime of the application. The method 400 is complete after this selection.

At block 414, the transformation selection module 102 determines whether the read frequency and the write frequency for the current persistent data 114 are above a read threshold and above a write threshold, respectively and determines whether the data volume for the current persistent data 114 is above a volume threshold. With reference to FIG. 3, the transformation selection module 102 is determining whether the data falls into the section 306 (above the write threshold 320 and the above threshold 322) of the graph 300 (with a high data volume). Similar to the write threshold and the read threshold values, the volume threshold can vary depending on a number of factors. Factors can include the type of application, the type of data, etc. Further, this value can be configurable, thereby enabling a user to set this value. If the read frequency and the write frequency are above the read threshold and the write threshold, respectively, and the data volume is above the volume threshold, the method 400 continues at block 416. Otherwise, the method 400 continues at block 418 (described below).

At block 416, the transformation selection module 102 selects the incremental conversion and the lazy migration to transform the data to a second format. In some example embodiments, the incremental conversion is performed (during uptime of the application) prior to downtime of the application. In some example embodiments, the lazy migration is performed (during uptime of the application) after downtime of the application. The method 400 is complete after this selection.

At block 418, the transformation selection module 102 selects down time migration to transform the data to a second format. The method 400 is complete after this selection.

The method 400 is described with reference to certain types of migration and certain checks relative to the read frequency, the write frequency and the data volume. In some other example embodiments, other types of data migration are used. For example, in some example embodiments, types of data migration are used that occur during but prior to down time of the application, if the write frequency and the read frequency are below and above the write threshold and the read threshold, respectively. In some other example embodiments, different numbers of thresholds could be used in the determination of the type of data migration. For example, instead of determining both the write frequency and the read frequency, in some example embodiments, only one of such frequencies is used.

Figure 5:
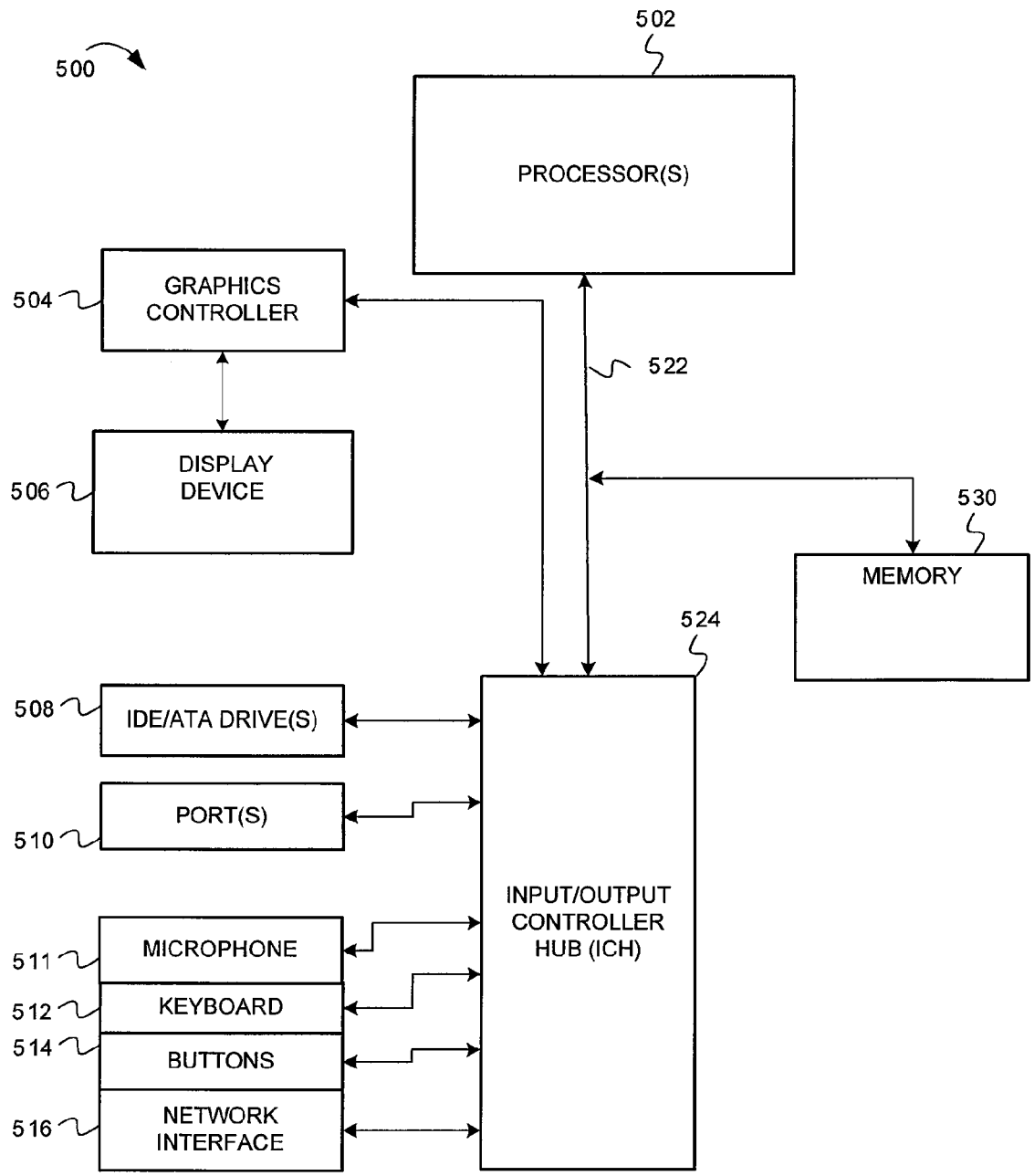
FIG. 5 is a computer device that executes software for performing operations related to data migration, according to some example embodiments.

An embodiment wherein software performs operations related to data migration as described herein is now described. In particular, FIG. 5 is a computer device that executes software for performing operations related to performing multi-document viewing, according to some example embodiments. In some example embodiments, FIG. 5 illustrates a computer device 500 that is representative of at least part of the system 100.

As illustrated in FIG. 5, a computer device 500 comprises processor(s) 502. The computer device 500 also includes a memory 530, a processor bus 522, and an input/output controller hub (ICH) 524. The processor(s) 502, the memory 530, and the ICH 542 are coupled to the processor bus 522. The processor(s) 502 can comprise any suitable processor architecture. The computer device 500 can comprise one, two, three, or more processors, any of which may execute a set of instructions in accordance with some example embodiments.

The memory 530 stores data and/or instructions, and comprises any suitable memory, such as a random access memory (RAM). For example, the memory 530 can bee a Static RAM (SRAM), a Synchronous Dynamic RAM (SDRAM), DRAM, a double data rate (DDR) Synchronous Dynamic RAM (SDRAM), etc. A graphics controller 504 controls the display of information on a display device 506, according to some example embodiments.

The ICH 524 provides an interface to Input/Output (I/O) devices or peripheral components for the computer device 500. The ICH 524 comprises any suitable interface controller to provide for any suitable communication link to the processor(s) 502, the memory 530 and/or to any suitable device or component in communication with the ICH 524. For some example embodiments, the ICH 524 provides suitable arbitration and buffering for each interface.

The ICH 524 provides an interface to one or more suitable Integrated Drive Electronics (IDE)/Advanced Technology Attachment (ATA) drive(s) 508, such as a hard disk drive (HDD). In some example embodiments, the ICH 524 also provides an interface to a keyboard 512, a mouse 514, one or more suitable devices through ports 516-518 (such as parallel ports, serial ports, Universal Serial Bus (USB), Firewire ports, etc.). In some example embodiments, the ICH 524 also provides a network interface 520 though which the computer device 500 communicates with other computers and/or devices.

With reference to the system 100, the memory 530 and/or one of the IDE/ATA drives 508 can store the current persistent data 114 and the new persistent data 116. In some example embodiments, the transformation selection module 102, the transformation module 104, the application module 106, the application (version A) 108 and the application (version B) 110 are sets of instructions executing within the processor(s) 902. Therefore, the transformation selection module 102, the transformation module 104, the application module 106, the application (version A) 108 and the application (version B) 110 can be stored in a machine-readable medium that are a set of instructions (e.g., software) embodying any one, or all, of the methodologies described herein. For example, the transformation selection module 102, the transformation module 104, the application module 106, the application (version A) 108 and the application (version B) 110 can reside, completely or at least partially, within the memory 930, the processor(s) 902, one of the IDE/ATA drive(s) 908, etc.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components.

Embodiments of the invention include software, data processing hardware, data processing system-implemented methods, and various processing operations, further described herein.

A number of figures show block diagrams of systems and apparatus for data migration, in accordance with some example embodiments. Flow diagrams illustrate the operations for data migration, in accordance with some example embodiments. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A computerized method comprising:
   determining at least one of a read frequency, a write frequency and a data volume for data persistently stored, the data having a first format;
   selecting a first type of data migration or a second type of data migration, the selecting being derived from at least one of the read frequency, the write frequency and the data volume for the data persistently stored, the first type of data migration comprising an incremental conversion, and the second type of data migration comprising a lazy migration;
   upgrading an application from a current version to a new version, the application to access the data during execution, the upgrading occurring during a downtime of the application;
   automatically determining whether the first type of data migration or the second type of data migration was selected;
   in accordance with a determination that the first type of data migration was selected, transforming the data to a second format using the first type of data migration during an uptime of the application occurring prior to the downtime of the application;
   in accordance with a determination that the second type of data migration was selected, transforming the data to the second format using the second type of data migration during an uptime of the application occurring after the downtime of the application; and
   outputting the transformed data for storage in a machine-readable medium.

2. A non-transitory machine-readable medium that provides instructions which, when executed by a machine, cause said machine to perform operations comprising:
   determining a read frequency and a write frequency for data persistently stored, the data having a first format;
   selecting a first type of data migration or a second type of data migration, the selecting being derived from at least one of the read frequency, the write frequency and the data volume for the data persistently stored, the first type of data migration comprising an incremental conversion, and the second type of data migration comprising a lazy migration;
automatically determining whether the first type of data migration or the second type of data migration was selected;
in accordance with a determination that the first type of data migration was selected, transforming the data to a second format using the first type of data migration during an uptime of an application occurring prior to a downtime of the application;
in accordance with a determination that the second type of data migration was selected, transforming the data to the second format using the second type of data migration during an uptime of an application occurring after the downtime of the application; and
outputting the data for storage in a machine-readable medium.

3. The non-transitory machine-readable medium of claim 2, further comprising upgrading the application from a current version to a new version, wherein the application accesses the data during execution.

4. The non-transitory machine-readable medium of claim 3, wherein determining the read frequency and the write frequency comprises determining the read frequency and the write frequency from accesses of the data by the current version of the application.

5. An apparatus comprising:
a machine-readable medium to store a current version of data having a first format; and
at least one processor to upgrade an application from a current version to a new version, the at least one processor to:
determine at least one of a read frequency, a write frequency, and a data volume for the current version of the data;
select a first type of data migration or a second type of data migration, the selecting being derived from at least one of the read frequency, the write frequency and the data volume for the data persistently stored, the first type of data migration comprising an incremental conversion, and the second type of data migration comprising a lazy migration;
automatically determine whether the first type of data migration or the second type of data migration was selected;
in accordance with a determination that the first type of data migration was selected, transform the data to a second format using the first type of data migration during an uptime of the application occurring prior to a downtime of the application;
in accordance with a determination that the second type of data migration was selected, transform the data to the second format using the second type of data migration during an uptime of the application occurring after the downtime of the application; and
output the data for storage in a machine-readable medium.

6. The apparatus of claim 5, wherein the read frequency and the write frequency are determined from a number of read accesses and a number of write accesses of the data by the current version of the application, respectively.

7. A computerized system comprising:
a machine-readable medium to store persistent data having a first format;
an application module, executable by at least one processor, to execute an application that is to access the persistent data, the application module to upgrade the application from a current version to a new version for execution;
a transformation selection module to determine at least one of a read frequency, a write frequency and a data volume of the persistent data, the transformation selection module to select a selected transformation from a first type of data migration or a second type of data migration, the selection being derived from at least one of the read frequency, the write frequency and the data volume, the first type of data migration comprising an incremental conversion, and the second type of data migration comprising a lazy migration;
a determination module to automatically determine whether the first type of data migration or the second type of data migration was selected; and
a transformation module to, in accordance with a determination that the first type of data migration was selected, transform the data to a second format using the first type of data migration during an uptime of the application occurring prior to a downtime of the application, and, in accordance with a determination that the second type of data migration was selected, transform the data to the second format using the second type of data migration during an uptime of the application occurring after the downtime of the application.

8. The computerized system of claim 7, wherein the transformation using the first type of data migration is to occur prior to the downtime of the application as part of the upgrade.

9. The computerized system of claim 7, wherein the transformation using the second type of data migration is to occur after the downtime of the application as part of the upgrade.

* * * * *